Sept. 23, 1924.                                                        1,509,168
                                J. I. MULLEN
                       TRACTION LUG FOR MOTOR VEHICLES
                            Filed April 29, 1922
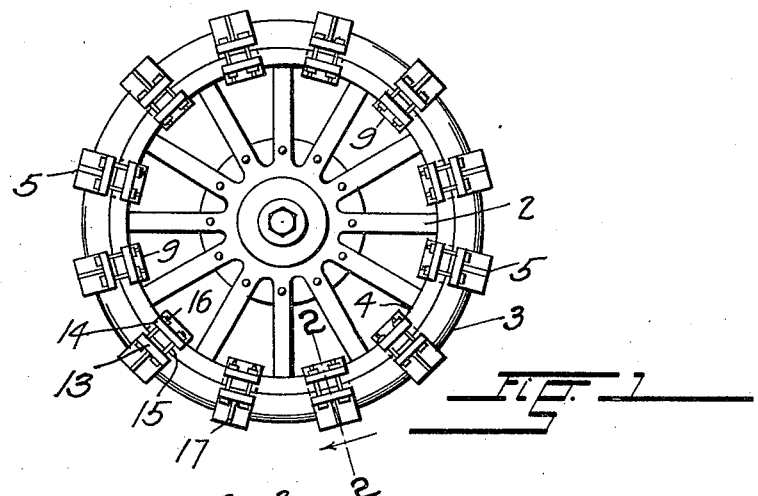
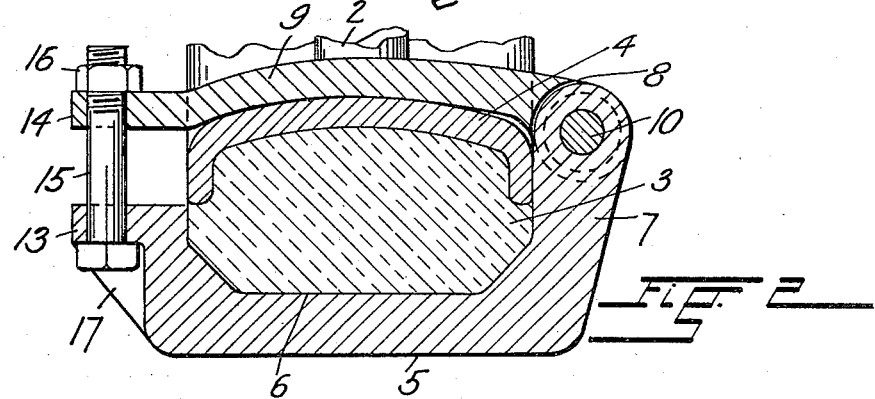
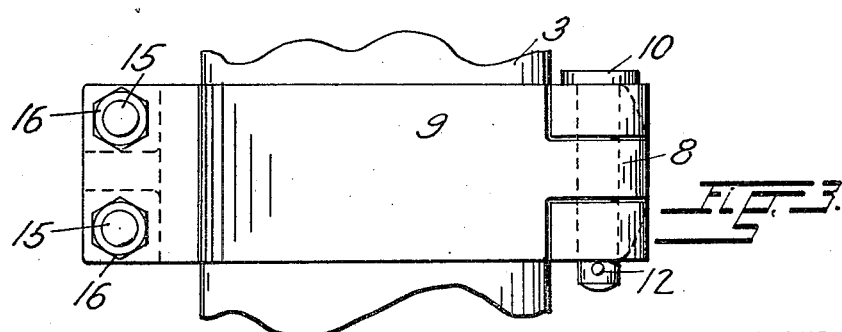
INVENTOR.
JOHN I. MULLEN.
BY
ATTORNEY.

Patented Sept. 23, 1924.

1,509,168

UNITED STATES PATENT OFFICE.

JOHN I. MULLEN, OF NATURITA, COLORADO.

TRACTION LUG FOR MOTOR VEHICLES.

Application filed April 29, 1922. Serial No. 557,450.

*To all whom it may concern:*

Be it known that I, JOHN I. MULLEN, a citizen of the United States, residing at Naturita, in the county of Montrose and State of Colorado, have invented certain new and useful Improvements in Traction Lugs for Motor Vehicles, of which the following is a specification.

This invention relates to attachments for rubber tired vehicle wheels, commonly known as mud lugs, and its object is to provide a device of this character which combines exceptional strength and durability with simplicity of construction and which may be readily attached to or detached from the wheel.

The mud lug presents a convenient medium for increasing the traction of the wheels of motor driven vehicles on muddy and slippery roads and it is particularly adapted for use in connection with the wheels of power driven trucks, equipped with solid rubber tires.

I am aware that lugs of different forms have been used heretofore for the same purpose, and I desire it understood that my invention resides solely in details of construction which give to the device the strength, durability and practicability, which permit of its ready application and which enable it to withstand the heavy strains to which it is subjected in the operation of the wheel to which it is attached.

With the above objects in view, my improved mud lug is composed of two permanently connected solid members adapted to clampingly engage the felly and tire of a vehicle wheel of the kind used in trucks and other motor vehicles, and ordinary machine bolts which by engagement with said members secure the device in place upon the wheel. The parts of the lug and their connections are made of steel or other wear-resisting metal and they are formed and proportioned to conjunctively provide the required degree of durability and strength.

An embodiment of my invention has been illustrated in the accompanying drawings in the various views of which like parts are similarly designated and in which—

Figure 1 represents a side elevation of a vehicle wheel equipped with my improved lugs;

Figure 2 a section on the line 2—2 Figure 1, drawn to an enlarged scale; and

Figure 3 a top view of the lug in connection with the wheel felly to which it is applied.

Referring more specifically to the drawings the reference character 2 designates a truck wheel equipped with a solid rubber tire 3 which is fitted upon a channeled felly 4.

My improved mud lug consists of a heavy shoe 5 which is recessed as at 6, to snugly fit upon the tire in transverse relation thereto. The recess of the shoe is shaped in conformity with the contour of the exterior portion of the tire so that when placed thereon, it is secure against lateral displacement.

The shoe has at one end, an inwardly extended wall 7 which is of the same width as its body portion and the inner end of which is grooved to receive a hinge-knuckle 8 on the other member 9 of the device which is adapted to be passed across the felly of the wheel. The knuckle of the member 9 and the extended wall of the shoe member 5 have registering openings for their movable connection by a headed hinge-bolt 10 which is held against longitudinal displacement by a cotter pin 12.

The member 9 of the lug which serves to retain it in position on the wheel felly consists of a solid metal bar corresponding in width with the shoe member and slightly curved to fit upon the felly of the wheel. The knuckle of the member is in alinement with its body portion in central relation to an end thereof, and the wall of the shoe member, in order to meet the knuckle, is extended to a point beyond the surface of the felly with which the member 9 engages.

The two members of the lug have at their ends opposite to their hinged connection, outwardly projecting apertured lips 13 and 14 which when the device is in place on the wheel, extend in substantially parallel relation to each other. Each lip has two apertures alined with those of the other, to receive the coupling bolts 15 which in co-operation with nuts 16 screwed upon their threaded ends, serve to draw the lips together and thereby clamp the lug in rigid connection with the wheel to which it is applied. The lip of the shoe member 5 is braced between its openings by a rib 17 which extends slantingly to the outer surface of the member.

It will be apparent that a lug constructed as shown and described is of sufficient strength to withstand the shocks and stresses to which it is subjected while the wheel to which it is applied, is in motion; that it is readily fastened to and detached from the wheel; that the absence of separable parts usually found in devices of this character reduces to a minimum the chances of breakage and relative displacement; and, that the only removable parts, the coupling bolts 15, are readily replaced in case of breakage, wear or loss.

Having thus described my invention what I claim and desire to secure by Letters-Patent is:

A mud lug for motor vehicle wheels comprising a relatively massive solid shoe member formed to provide a tread portion of a substantial tractive area and oppositely disposed side wall portions, the inner surfaces of said tread and side wall portions being continuous one with the other to snugly seat transversely over a portion of the tire, one of the side wall portions being extended to project inwardly of the rim at its inner side and having its free end centrally bifurcated to provide spaced pivot ears having aligned apertures therein, a retaining member having a pivot ear formed centrally of its inner end for engagement between the said spaced ears, the pivot ear of said retaining member being apertured for alignment with the apertures of said spaced ears, a pivot pin passing through the aligned apertures of all of said ears for hinging said retaining member in position, the other of said side wall portions being substantially shorter than said first mentioned side wall portion and having its free end terminating in close proximity to the adjacent edge of the rim and in spaced relation to the overlying end of said retaining member, and headed fastenings carried by the shorter side wall portion and adapted to engage the overlying end of said retaining member whereby the latter is clamped firmly against the inner side of the rim.

In testimony whereof I have affixed my signature.

JOHN I. MULLEN.